United States Patent [19]

Vanhala

[11] Patent Number: 4,936,136

[45] Date of Patent: Jun. 26, 1990

[54] METHOD FOR CHECKING THE FRICTION BETWEEN THE TRACTION SHEEVE AND THE SUSPENSION ROPES OF AN ELEVATOR

[75] Inventor: Timo Vanhala, Hyvinkää, Finland

[73] Assignee: Kone Elevator GmbH, Baar, Switzerland

[21] Appl. No.: 338,085

[22] Filed: Apr. 14, 1989

[30] Foreign Application Priority Data

Apr. 18, 1988 [FI] Finland .................................. 881811

[51] Int. Cl.[5] ......................... G01N 19/02; G01L 5/00

[52] U.S. Cl. ............................................. 73/9; 73/158; 73/862.56

[58] Field of Search ........... 73/9, 158, 862.56, 862.44, 73/828, 829

[56] References Cited

U.S. PATENT DOCUMENTS 2,016,332 10/1935 Lee .................................... 73/158 X
3,382,713 5/1968 Chatter .............................. 73/158 X
3,921,536 11/1975 Savage ................................ 104/202
4,630,472 12/1986 Zimmerman ................ 73/862.44 X

*Primary Examiner*—Tom Noland
*Attorney, Agent, or Firm*—Sughrue, Mion, Zinn, Macpeak & Seas

[57] ABSTRACT

In a method for checking and monitoring the friction between the traction sheave and the suspension ropes of an elevator, the slippage between the traction sheave and the suspension ropes of the elevator is measured, the elevator comprising an elevator machine, a hoistway and an elevator car and a counterweight moving in the hoistway. The rope slippage is measured either periodically by performing test drives or continuously by means of an impulse device placed in the elevator machine and measuring the motion of the tractin sheave, an impulse device monitoring the movement of the elevator car and an impulse device monitoring the load in the car. The data provided by these impulse devices is transmitted to a computer which calculates and monitors the relative slippage between the traction sheave and the suspension ropes of the elevator.

6 Claims, 5 Drawing Sheets

1
2
3
4
5
6
7
dH
$T_1$
$T_2$

METHOD FOR CHECKING THE FRICTION BETWEEN THE TRACTION SHEEVE AND THE SUSPENSION ROPES OF AN ELEVATOR

BACKGROUND OF THE INVENTION

1. Field of the Invention

The present invention concerns a method for checking and monitoring the friction between the traction sheave and the suspension ropes of an elevator, whereby the slippage between the traction sheave and the suspension ropes is measured, the elevator comprising the elevator machine, the hoistway and the elevator car and counterweight moving in the hoistway.

2. Description of Related Prior Art

The safety of a traction sheave elevator depends, among other things, on whether the friction between the traction sheave and the suspension ropes is sufficient. As is known, the friction is dependent on many factors and subject to change in the course of time. Among such factors are wear of the rope groove, reduction of the rope diameter, changes in the lubrication conditions and tolerances in connection with change of ropes and machining of the grooves. A reduced friction may involve risks regardless of whether the safety gear of the elevator is designed to operate during downward movement or both downward and upward movement.

SUMMARY OF THE INVENTION

The object of the present invention is to achieve a simple method for checking, either periodically or continuously, the friction between the traction sheave and the suspension ropes of an elevator. The method provides information that at least indicates whether the rope slippage is of a dangerous order.

The method of the invention comprises the steps of measuring of slippage of rope by means of an impulse device placed in said elevator machine and measuring motion of the traction sheave, an impulse device monitoring movement of the elevator car and an impulse device monitoring the load in the car, and transmitting data provided by the impulse devices to a computer which calculates and monitors relative slippage between the traction sheave and the at least one suspension rope.

In a preferred embodiment of the invention the measuring of slippage of rope between a traction sheave and at least one suspension rope is effected by performing two test drives of different lengths, of which one is a short drive largely comprising only acceleration and deceleration of the elevator car and in which case a constant speed portion of the drive is short, and the other a considerably longer drive and in which case a constant speed portion is large, determining from the data supplied to the computer by the impulse devices the slippage that has occurred and comparing, by means of the computer, the ratio of the slippage distance to the driving distance obtained for one of the test drives to the corresponding ratio obtained for the other of the test drives.

In another preferred embodiment of the invention the measurement of rope slippage is based on the data supplied by an impulse transducer measuring the rotary motion of the elevator machine, an impulse switch monitoring the arrival of the elevator car at levels along the hoistway and a device, e.g. a load-weighing device, measuring the load in the car.

In a further preferred embodiment of the invention the above-mentioned impulse transducer is connected to a counter which counts pulses supplied by the impulse transducer mounted in the elevator machine, so that when the car travels in the hoistway from an original position toward a destination position the counter increases count of pulses and when the car reaches a destination level and turns back the counter begins to decrease the count of pulses, such that when the car has again reached the original position, the counter indicates net slippage of rope for the drive from the original position to the destination level and back to the original position, the test drive being repeated several times for both a short driving distance and a long driving distance.

BRIEF DESCRIPTION OF THE DRAWINGS

Further objects, features and advantages of the invention will become apparent to those skilled in the art from the following description thereof when taken in conjunction with the accompanying drawings, in which.

DESCRIPTION OF THE PREFERRED EMBODIMENTS

Figure 1:
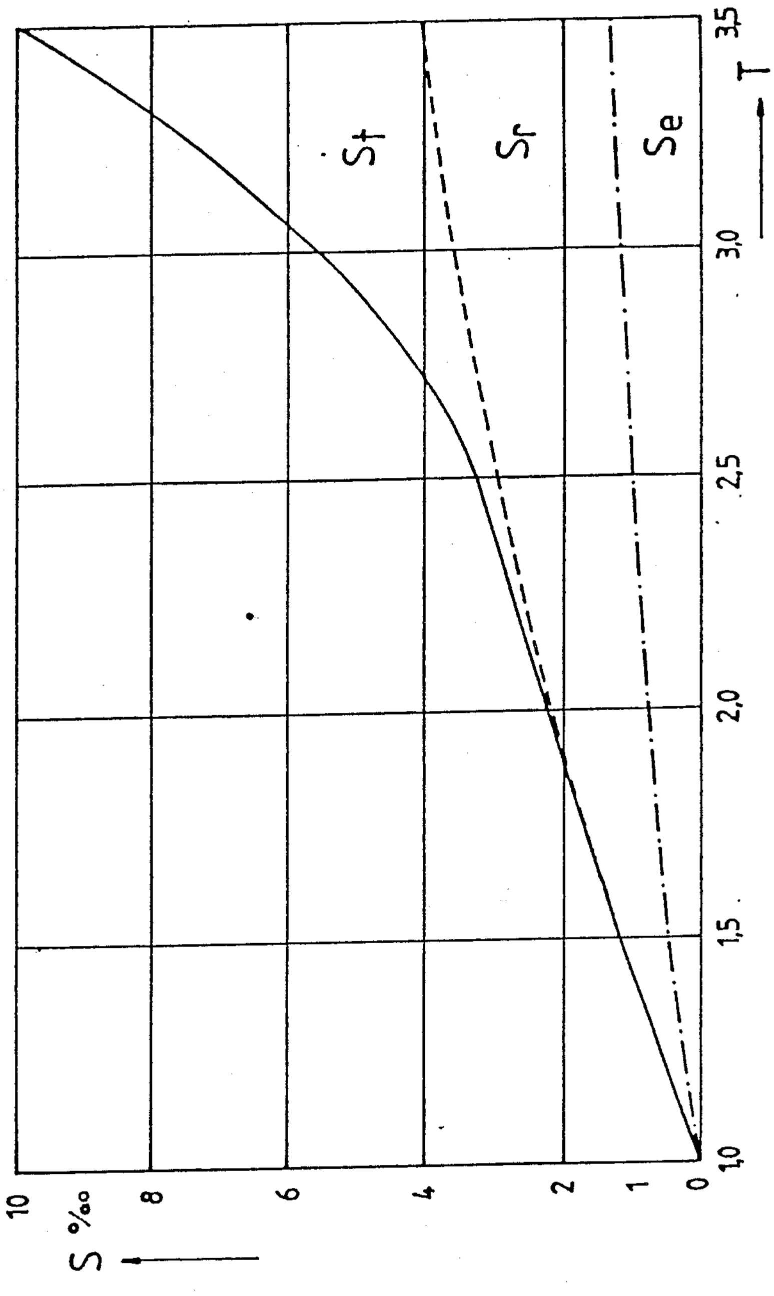
Fig.1 PRIOR ART
FIG. 1 shows the dependence of the rope slippage, S, on the rope force ratio T, FIGS. *2a* and *2b* show curves indicating the relative slippage for rope force loading conditions during acceleration, constant speed drive and deceleration, FIGS. *3a–3c* represent a simple elevator suspension with the elevator car in different positions, and the measurement of the slippage, FIGS. *4a* and *4b* are graphs showing the change in elevator speed versus distance travelled during a short and a long test drive respectively.

Referring to FIGS. 1, *3a–3c* and 5, the rope force ratio, T, is the ratio of the forces acting on the ropes 3 going to the counterweight 2 and to the elevator car 1. The observed relationship between S and T is similar to that in an AC motor, in which the slippage at first increases in a linear fashion but rises abruptly when the torque becomes too large. The curve in FIG. 1 was taken from M. Molkow's treaties "Die Treibfähigkeit von gehärteten Treibscheiben mit Keilrillen".

The total slippage S consists of the elastic elongation $S_e$ of the rope, the set Sr of the rope in the groove and the real slippage $S_t$. As shown by FIG. 1, the slip increases sharply after the linear phase. An elevator should always operate within the linear portion of the curves, i.e. it should never be allowed to enter the region of heavy slippage.

Three phases are distinguished in a drive: acceleration, constant speed drive and deceleration. The rope force ration varies during the drive as follows:

| $T = T_2(g + a)/T_1(g - a)$ | |
|---|---|
| in acceleration | $T = T_s{*}g_a$ |
| in deceleration | $T = T_s{*}g_d$ |
| in constant speed drive | $T = T_s{*}1$ |

wherein the static rope force ration $T_s=T_2/T_1$, the acceleration factors are $g_a$ for acceleration and $g_d$ for declaration and the acceleration factor $g_2$ or $g_d=(g+1)/(g-a)$, in which $g=9.81$ m/s$^2$, the gravitational acceleration factor, and a=acceleration or deceleration.

Figure 2A:
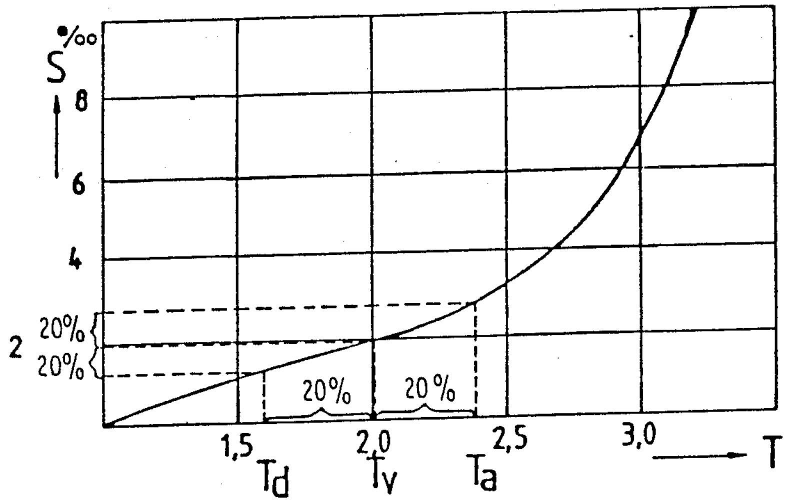
Figure 2B:
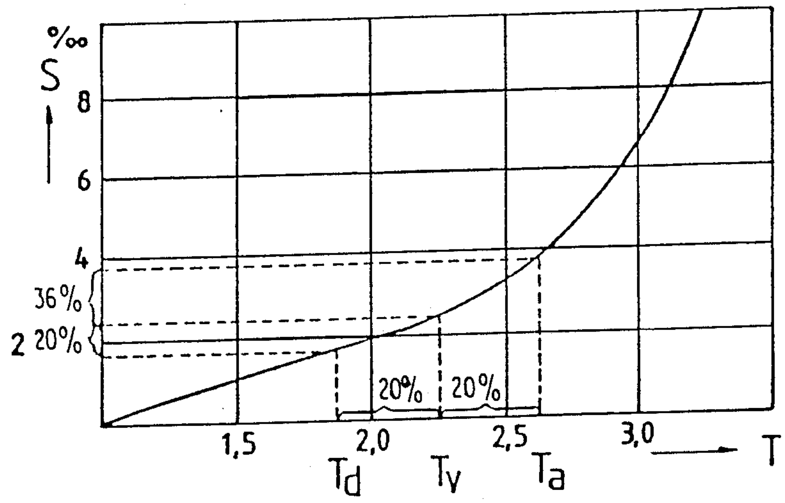

For example, for an upward drive with any empty car, when $a=\pm0.9$ m/s$^2$, $g=1.2$ and $g_d=1.01$, i.e. the acceleration causes a 20% slip. If the slippage increases beyond this, the elevator is operating in the non-linear region and the safe ratings have been exceeded (FIG. 2*b*).

Figures 3A, 3B, 3C:
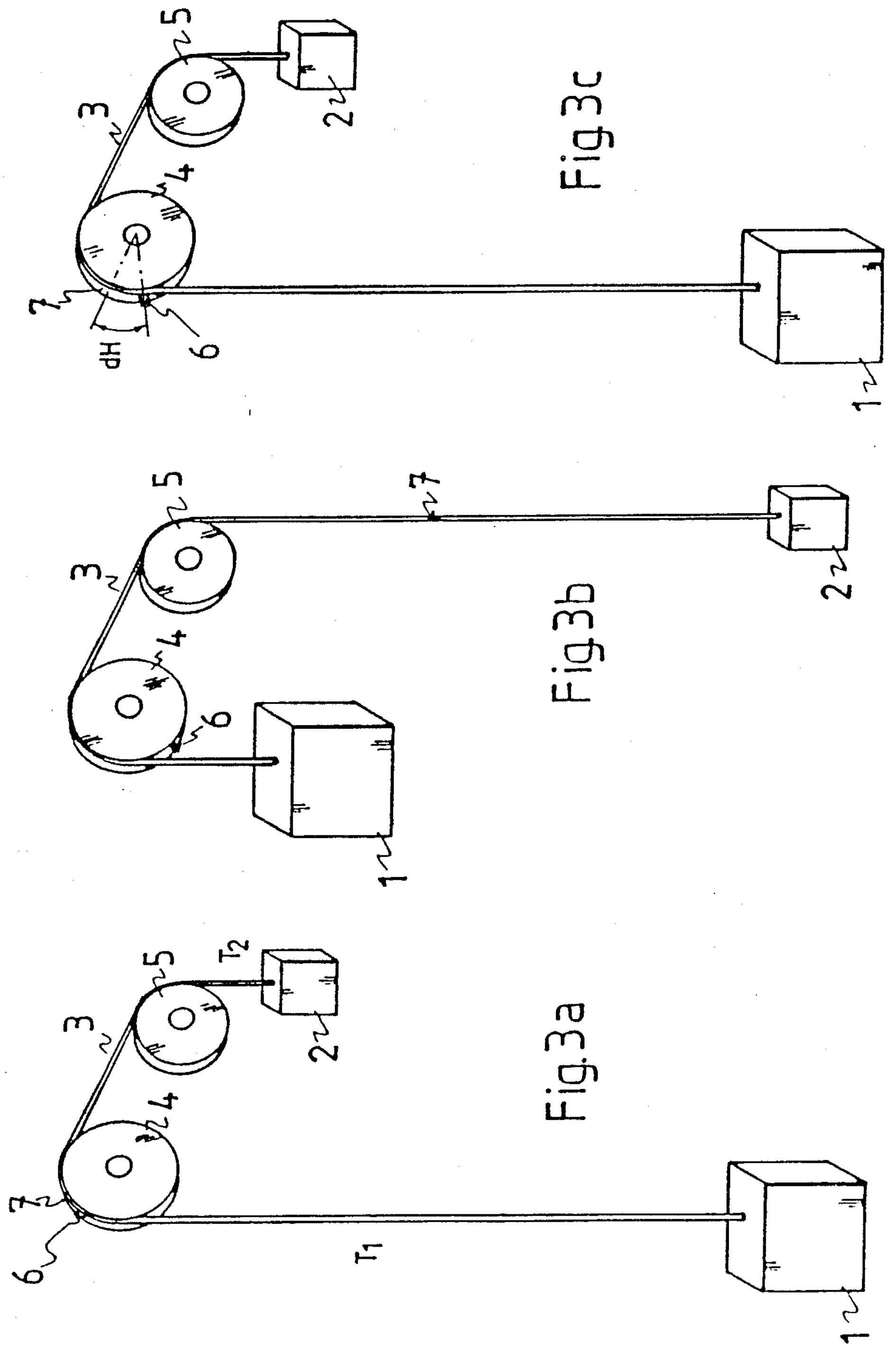

The friction of a traction sheave elevator may be ascertained manually by a simple procedure based on a comparison of measurement results. This procedure is explained below with reference to FIGS. 3*a*-3*c*. These Figures show a simple elevator suspension system in which the elevator car 1 and the counterweight 2 are connected to each other by the suspension ropes 3, which run over the traction sheave 4 and the deflector pulley 5. At the beginning of the test, a piece of tape 6 is attached to the traction sheave 4 and another piece of tape 7 is attached to the rope 3 (FIG. 3*a*) at the same position. The elevator is then driven to another floor, so that the pieces of tape will be at the positions shown in FIG. 3*b* when the elevator stops. Finally, the elevator is driven back to the initial position in FIG. 3*a*. The slippage produced during the drive can now be established by measuring the distance between the tapes 6 and 7.

The procedure can normally be performed with an empty car, because in that case the rope force ratio is worst in respect of rope slippage.

Figure 4A:
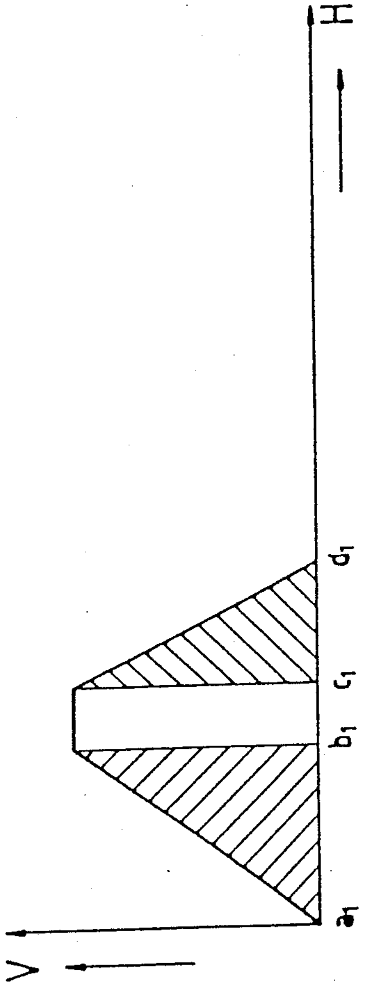
Figure 4B:
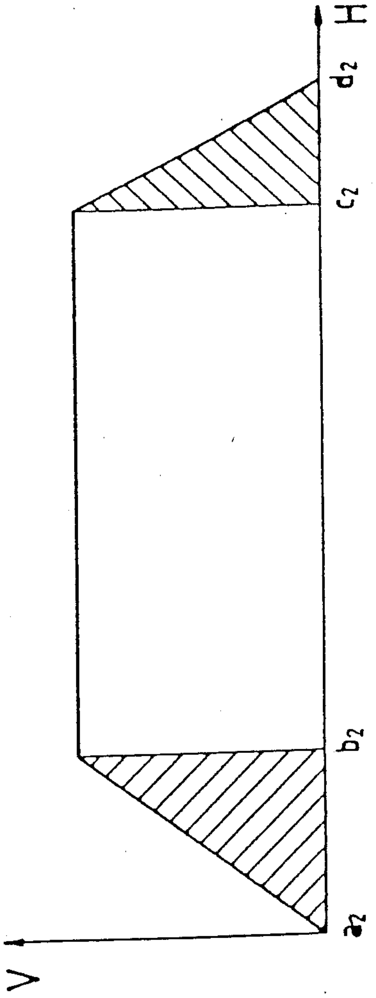
Figure 5:
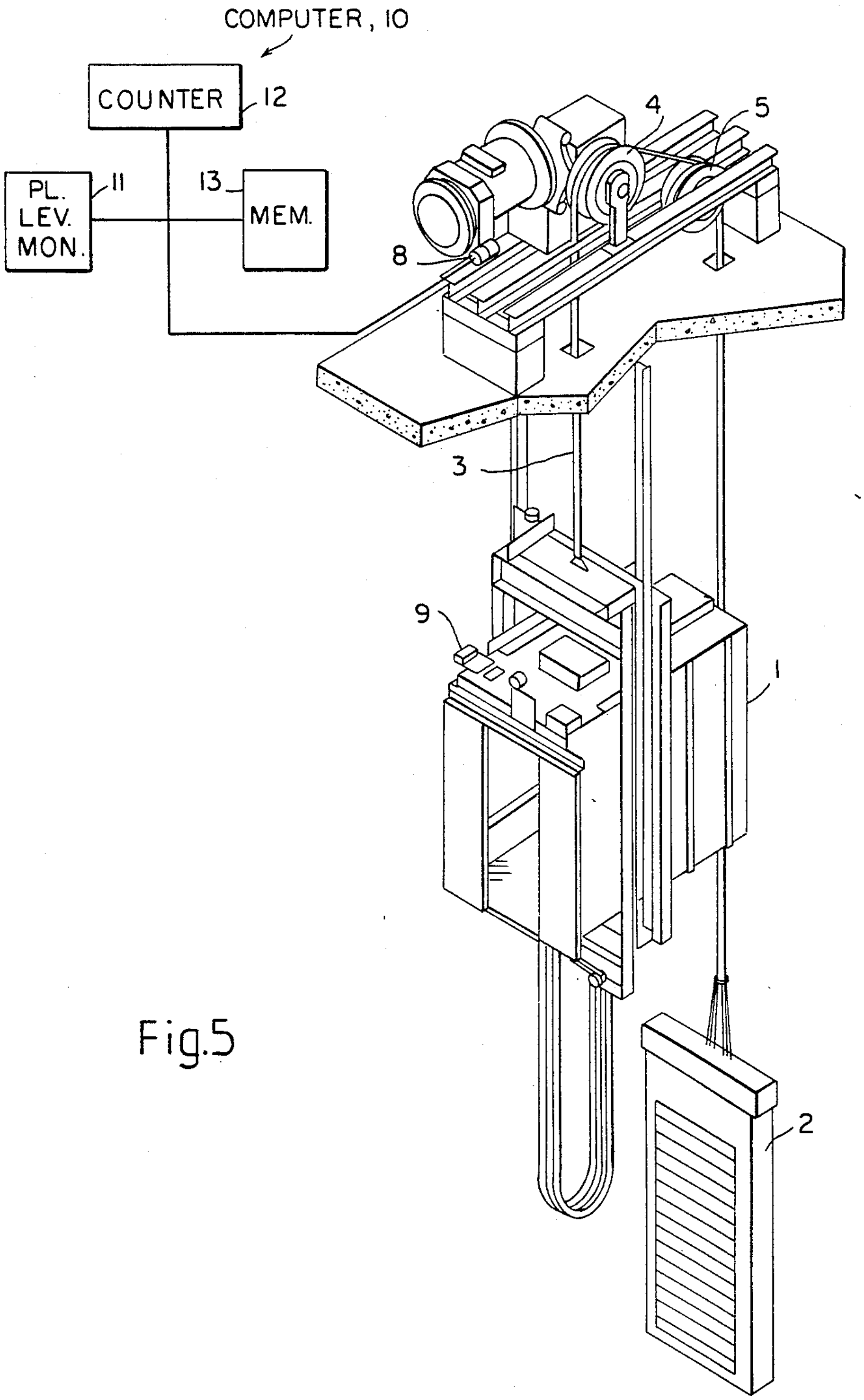
FIG. 5 is a perspective view of the construction of a conventional traction sheave elevator, to which the method of the invention is applied.

The method of the invention can be easily visualized by performing two slippage measurements as described above. One of the measurements is performed on a short test drive and the other on the long test drive. The slippage values are compared to the driving distances. The total real slippage for a short test drive consists of the slippage that occurred during the acceleration and/or deceleration. In FIG. 4*a*, the interval $a_1$-$b_1$ corresponds to the acceleration phase of the drive, the interval $b_1$-$c_1$ to the constant speed phase, and the interval $c_1$-$d_1$ to the deceleration or braking phase. In the case of a longer test drive (FIG. 4*b*), the acceleration phase $a_2$-$b_2$ constitutes a smaller portion of the total driving distance $a_2$-$d_2$. Now, if the average slippage percentage for the longer drive is found to be lower than for the shorter drive, this is an indication that the elevator has operated in the region of real slippage. Again, if the slippage percentage is the same for both driving distances, then the friction between the traction sheave and suspension rope is sufficient all the time.

When the slippage is due to the elastic elongation of the rope, the differences in the slippage percentages in acceleration and deceleration compensate each other and the average value equals the slippage percentage for constant speed drive, so that the slippage percentages for different driving distances are equal.

When the elevator is operated in the region of nonlinear slippage and a more accurate value of the slippage percentage is desired, the short-drive slippage is subtracted from the long-drive slippage. The difference between these percentage values indicates the amount of real slippage.

The slippage percentages are now:

| | |
|---|---|
| for a short drive | $S_s = dH_s/H_s * 100$ (%) and |
| for constant speed drive | $S_v = (dH_1 - dH_s)/(H1 - H_s) * 100$ (%) |

where $S_s$=slippage percentage for a short drive $S_v$=slippage percentage for constant-speed drive $dH_s$=slippage distance for a short drive $dH_l$=slippage distance for a longer drive $H_s$=driving distance for a short drive $H_l$=driving distance for a longer drive If $S_s > S_v$, then there is slippage during acceleration. The accuracy of the results can be improved by repeating the test several times.

Measurements have shown that most slippage occurs during acceleration, especially when high acceleration values are used. In such cases the slippage for a drive from the starting level to the detection and back is of an order exceeding 40 mm/30 m lifting height, while the normal slippage value is below 25 mm/30 m lifting height (with a rope groove undercut angle of 102° and a 180° angle of contact between the suspension ropes and the traction sheave).

In a preferred embodiment of the invention, the method is applied as follows. The measurement is performed by means of an impulse transducer 8 monitoring the rotation of the machine, an impulse switch 9 registering the arrival of the elevator car 1 at the floor level, and a device, e.g. a load-weighing device (not shown in the figures), measuring the car load. The impulse switches 9 at the floor levels provide accurate information indicating the car position. When an empty car departs from the starting level, the impulse switch 9 starts a counter 12 which counts the pulses supplied by the impulse transducer 8 monitoring the rotation of the machine. When the car reaches the destination level and starts the return drive, the counter 12 begins to decrease the pulse count. When the car reaches the starting level again, the pulse count in the counter 12 indicates the slippage that has occurred during the drive to the destination and back. By performing a short and a long drive in this way, it can be established by the method of the invention whether the elevator is operating in a safe region of rope/sheave friction. If the drive is repeated, e.g. five times, before reading the counter 12 a considerably more accurate measurement result is obtained.

If precise data indicating the distances between levels in the hoistway are available, the measurement can be performed every time when the car 1 is running empty. The impulse switch 9 starts the counter, and when the car stops at another level in the hoistway, the impulse switch of that level stops the counter. The pulse count obtained is then compared to the distance between the levels in question, the levels being stored in the plural level monitor 11 and the distance data being stored in memory 13. The difference thus obtained indicates the slippage that has occurred during the drive. In this manner, the slippage can be measured every time the car runs empty, and the measurement can be effected between any two levels in the hoistway.

The counter may be connected to the computer 10 controlling and supervising the operation of the elevator. The computer 10 monitors the relative slippage during short and long drives and gives a warning if dangerous slippage values are observed. The computer 10 may do this either automatically or via a test arrangement. As described before, the monitoring may also be done by comparing the original slippage values to the measured values.

It is obvious to a person skilled in the art that the invention is not restricted to the examples of its embodiments described above, but that it may instead be varied within the scope of the following claims.

I claim:

1. A method for checking and monitoring the friction between an elevator traction sheave and at least one elevator suspension rope, whereby slippage between said traction sheave and said at least one suspension rope is measured, the elevator comprising an elevator machine, a hoistway and an elevator car and a counterweight moving in said hoistway, said method comprising the steps of measuring of slippage of said at least one suspension rope by means of an impulse device placed in said elevator machine and measuring motion of said traction sheave, an impulse device monitoring movement of said elevator car and an impulse device monitoring the load in said car, and transmitting data provided by said impulse devices to a computer which calculates and monitors relative slippage between said traction sheave and said at least one suspension rope.

2. A method according to claim 1, wherein said measuring of slippage of rope between said traction sheave and said at least one suspension rope is effected by performing two test drives of different lengths, of which one is a short drive largely comprising only acceleration and deceleration of said elevator car and in which case a constant speed portion of said drive is short, and the other a considerably longer drive and in which case a constant speed portion is large, determining from said data supplied to said computer by said impulse devices the slippage that has occurred and comparing, by means of said computer, the ratio of the slippage distance to the driving distance obtained for one of said test drives to the corresponding ratio obtained for the other of said test drives.

3. A method according to claim 1, wherein said measuring of said slippage of said at least one suspension rope is performed on the basis of said data supplied by an impulse transducer measuring rotary motion of said elevator machine, an impulse switch monitoring arrival of said elevator car at levels along said hoistway and a device measuring the load in said car.

4. A method according to claim 3, wherein said impulse transducer is connected to a counter which counts pulses supplied by said impulse transducer mounted in said elevator machine, so that when said car travels in said hoistway from an original position toward a destination position said counter increases a count of pulses and when said car reaches a destination level and turns back said counter begins to decrease said count of pulses, such that when said car has again reached said original position, said counter indicates net slippage of rope for said drive from said original position to said destination level and back to said original position, said test drive being repeated for both a short driving distance and a long driving distance.

5. A method according to claim 3, wherein said measuring of slippage of said at least one suspension rope is carried out when said car is empty.

6. A method according to claim 3, wherein control of slippage of rope is implemented such that when said elevator car departs from an original position in said hoistway, said impulse switch starts a counter, and when said car stops at a destination level, an impulse switch corresponding to said destination level stops said counter, and that the obtained count of pulses is compared to data as to distance between said levels, said data as to distance between said levels being stored in memory.

* * * * *